United States Patent
Li et al.

(10) Patent No.: US 12,287,449 B2
(45) Date of Patent: Apr. 29, 2025

(54) THREE-DIMENSIONAL IMAGING METHOD AND SYSTEM FOR SURFACE COMPREHENSIVE GEOPHYSICAL PROSPECTING

(71) Applicant: SHANDONG UNIVERSITY, Shandong (CN)

(72) Inventors: Shucai Li, Jinan (CN); Yiguo Xue, Jinan (CN); Maoxin Su, Jinan (CN); Chunjin Lin, Jinan (CN); Li Guan, Jinan (CN); Daohong Qiu, Jinan (CN); Zhiqiang Li, Jinan (CN); Yimin Liu, Jinan (CN); Peng Wang, Jinan (CN); Huimin Gong, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 359 days.

(21) Appl. No.: 17/779,816

(22) PCT Filed: Jun. 16, 2021

(86) PCT No.: PCT/CN2021/100370
§ 371 (c)(1),
(2) Date: May 25, 2022

(87) PCT Pub. No.: WO2021/254394
PCT Pub. Date: Dec. 23, 2021

(65) Prior Publication Data
US 2023/0003917 A1    Jan. 5, 2023

(30) Foreign Application Priority Data
Jun. 18, 2020 (CN) .......................... 202010557781.X

(51) Int. Cl.
G01V 3/20 (2006.01)
G01V 8/02 (2006.01)

(52) U.S. Cl.
CPC ...................... *G01V 8/02* (2013.01)

(58) Field of Classification Search
None
See application file for complete search history.

(56) References Cited

U.S. PATENT DOCUMENTS

| 6,295,512 B1 * | 9/2001 | Bryant | ..................... G01V 3/02 324/357 |
| 2016/0124108 A1 | 5/2016 | Wu | |
| 2020/0096665 A1 * | 3/2020 | Wu | .......................... G01V 3/38 |

FOREIGN PATENT DOCUMENTS

| CN | 103728667 A | | 4/2014 |
| CN | 103728667 B | * | 8/2016 |

(Continued)

OTHER PUBLICATIONS

Badmus, B. S., Akinyemi, O. D., Olowofela, J. A., & Folarin, G. M. (2012). 3D electrical resistivity tomography survey for the basement of the Abeokuta terrain of Southwestern Nigeria. Journal of the Geological Society of India, 80(6), 845-854. https://doi.org/10.1007/s12594-012-0213-x (Year: 2012).*

(Continued)

*Primary Examiner* — Amandeep Saini
*Assistant Examiner* — Caroline Tabancay Duffy
(74) *Attorney, Agent, or Firm* — Oliff PLC

(57) ABSTRACT

A three-dimensional imaging method and system for surface comprehensive geophysical prospecting, the method includes: acquiring detection data of a plurality of two-dimensional profiles of a surface detection site; forming two-dimensional profile resistivity data by geophysical inversion of the detection data; performing three-dimensional coordinate conversion on the two-dimensional profile resistivity data to obtain resistivity data of a three-dimensional coordinate system; and converting the resistivity data (Continued)

of the three-dimensional coordinate system into a three-dimensional model by using a Kriging interpolation method.

7 Claims, 3 Drawing Sheets

(56) References Cited

FOREIGN PATENT DOCUMENTS

| CN | 104019765 | B | * | 10/2016 | | |
|---|---|---|---|---|---|---|
| CN | 104048605 | B | * | 1/2017 | | |
| CN | 106646624 | A | | 5/2017 | | |
| CN | 107305600 | A | | 10/2017 | | |
| CN | 107544095 | A | | 1/2018 | | |
| CN | 110333543 | A | | 10/2019 | | |
| CN | 110471122 | A | * | 11/2019 | ............... | G01V 3/38 |
| CN | 110530343 | A | | 12/2019 | | |
| CN | 110988999 | A | | 4/2020 | | |
| CN | 111856589 | A | | 10/2020 | | |
| EP | 3 136 132 | A1 | | 3/2017 | | |

OTHER PUBLICATIONS

Meng et al.; "3-D Inversion of High Density Resistivity Method Based on 2-D High-Density Electrical Prospecting Data and its Engineering Application;" Geophysical and Geochemical Exploration; 2019; pp. 672-679; vol. 43, No. 3.

Aug. 26, 2021 Search Report issued in International Patent Application No. PCT/CN2021/100370.

Aug. 26, 2021 Written Opinion of the International Searching Authority issued in International Patent Application No. PCT/CN2021/100370.

Mar. 3, 2021 Office Action and Search Report issued in Chinese Patent Application No. 202010557781.X.

* cited by examiner

THREE-DIMENSIONAL IMAGING METHOD AND SYSTEM FOR SURFACE COMPREHENSIVE GEOPHYSICAL PROSPECTING

TECHNICAL FIELD

The present invention belongs to the technical field of geophysical prospecting, and particularly relates to a three-dimensional imaging method and system for surface comprehensive geophysical prospecting.

BACKGROUND

Descriptions herein only provide background techniques related to the present invention, and do not necessarily constitute the related art.

Currently, in the geophysical prospecting field, methods, such as a cross-hole method, a well-ground method, a high-density electrical method, or a comprehensive geophysical prospecting method, are all commonly used detection methods on the site. The inventors found that the detection results of the above geophysical prospecting methods are mostly two-dimensional profiles, the number of measuring lines arranged on the site is numerous, and the two-dimensional profiles formed are very complicated. Resistivity data of a single two-dimensional profile obtained can reflect information of only one geological profile, which cannot reflect the actual situation of the underground complex structure and cannot be used to establish a model capable of displaying the results in an intuitive and visualized manner. However, in the analysis and interpretation of practical problems, it is often necessary to establish a three-dimensional model.

SUMMARY

In view of the deficiencies of the prior art, an object of the present invention is to provide a three-dimensional imaging method and system for surface comprehensive geophysical prospecting. The method can process and convert, after completing site detection, two-dimensional plane data obtained by the site detection into a three-dimensional space coordinate system to establish a three-dimensional resistivity profile model, so as to facilitate the establishment of a three-dimensional model in the later data analysis.

To achieve the foregoing objective, the present invention is implemented by the following technical solutions.

In a first aspect, an embodiment of the present invention provides a three-dimensional imaging method for surface comprehensive geophysical prospecting, including:
acquiring detection data of a plurality of two-dimensional profiles of a surface detection site;
forming two-dimensional profile resistivity data by geophysical inversion of the detection data;
performing three-dimensional coordinate conversion on the two-dimensional profile resistivity data to obtain resistivity data of a three-dimensional coordinate system; and
converting the resistivity data of the three-dimensional coordinate system into a three-dimensional model by using a Kriging interpolation method.

As a further technical solution, one of a cross-hole method, a well-ground method, a high-density electrical method, a transient electromagnetic method, and a surface comprehensive geophysical prospecting method is used to perform surface detection when acquiring the detection data of the two-dimensional profiles.

As a further technical solution, the process of three-dimensional coordinate conversion is:
determining an origin and establishing a three-dimensional coordinate axis;
obtaining position coordinates of a measuring line and a position of a two-dimensional profile resistivity data point on a measuring line plane; and
obtaining three-dimensional coordinates of the two-dimensional profile resistivity data point by a three-dimensional coordinate conversion formula.

As a further technical solution, an X direction of the three-dimensional coordinate axis is a horizontal distance direction in which a horizontal rightward direction is positive, a Y direction is a detection depth direction in which a ground parallel direction toward detection is positive, and a Z direction is a vertical distance direction in which a ground vertical downward direction is positive.

As a further technical solution, the three-dimensional coordinate conversion formula is:

$$\begin{bmatrix} X \\ Y \\ Z \end{bmatrix} = R_1 \begin{bmatrix} X_1 \\ Y_1 \\ Z_1 \end{bmatrix} + R_2 \begin{bmatrix} X' \\ Y' \\ 0 \end{bmatrix},$$

where X, Y and Z are final three-dimensional coordinates with O as an origin, $X_1$ is a horizontal distance from a starting point of the measuring line to the origin of coordinates, $Y_1$ is a longitudinal buried depth from the starting point of the measuring line to the origin of coordinates, $Z_1$ is a vertical height from the starting point of the measuring line to the origin of coordinates, X' is a horizontal length of an original data point, Y' is a detection depth of the original data point, Z' has an initial value of 0, $R_1$ is a position matrix, and $R_2$ is a data point matrix.

As a further technical solution, $R_1$ is $$\begin{bmatrix} 1 & 0 & 0 \\ 0 & 1 & 0 \\ 0 & 0 & 1 \end{bmatrix}.$$

As a further technical solution, if the measuring line plane is parallel to an XOZ plane of the three-dimensional coordinate system, $R_2$ is $$\begin{bmatrix} 1 & 0 & 0 \\ 0 & 0 & 0 \\ 0 & 1 & 0 \end{bmatrix}.$$

As a further technical solution, if the measuring line plane is parallel to a YOZ plane of the three-dimensional coordinate system, $R_2$ is $$\begin{bmatrix} 0 & 0 & 0 \\ 1 & 0 & 0 \\ 0 & 1 & 0 \end{bmatrix}.$$

As a further technical solution, if the measuring line plane is perpendicular to the XOY plane and an angle between the measuring line plane and a positive direction of a Y axis of the YOZ plane is α, $R_2$ is $$\begin{bmatrix} \cos\alpha & 0 & 0 \\ \sin\alpha & 0 & 0 \\ 0 & 1 & 0 \end{bmatrix},$$

and if the measuring line plane is perpendicular to the XOY plane and an angle between the measuring line plane and a negative direction of the Y axis of the YOZ plane is α, R2 is $$\begin{bmatrix} \cos\alpha & 0 & 0 \\ -\sin\alpha & 0 & 0 \\ 0 & 1 & 0 \end{bmatrix}.$$

In a second aspect, an embodiment of the present invention also provides a three-dimensional imaging system for surface comprehensive geophysical prospecting, including:
an acquisition module, configured to acquire detection data of a plurality of two-dimensional profiles of a surface detection site;
an inversion module, configured to form two-dimensional profile resistivity data by geophysical inversion of the detection data;
a coordinate conversion module, configured to perform three-dimensional coordinate conversion on the two-dimensional profile resistivity data to obtain resistivity data of a three-dimensional coordinate system; and
a conversion module, configured to convert the resistivity data of the three-dimensional coordinate system into a three-dimensional model by using a Kriging interpolation method.

Beneficial effects of the foregoing embodiments of the present invention are as follows:

The three-dimensional imaging method of the present invention has good compatibility, regardless of a cross-hole method, a well-ground method, a high-density electrical method, a transient electromagnetic method, or a comprehensive geophysical prospecting method, the obtained two-dimensional resistivity profile data can be converted into three-dimensional space rectangular coordinate system data by means of this method, and a three-dimensional model can be then formed.

The three-dimensional imaging method of the present invention is a visualized way of integrating profile data of a plurality of two-dimensional planes formed by hundreds of disordered measuring lines on a construction site into a three-dimensional model, can very intuitively reflect the actual situation of an abnormal body in a detection region and is also convenient for later interpretation, analysis and guidance.

In the three-dimensional imaging method of the present invention, a three-dimensional coordinate conversion method can convert two-dimensional profile data obtained from surface detection into resistivity data under a three-dimensional coordinate system, which is convenient for later data analysis and three-dimensional modeling and provides great convenience for carrying out later modeling, analysis and interpretation.

BRIEF DESCRIPTION OF THE DRAWINGS

The accompanying drawings constituting a part of the present invention are used for providing a further understanding of the present invention. The exemplary embodiments of the present invention and descriptions thereof are used for explaining the present invention, and do not constitute an improper limitation of the present invention.

DETAILED DESCRIPTION

It should be pointed out that the following detailed descriptions are all illustrative and are intended to provide further descriptions of the present invention. Unless otherwise specified, all technical and scientific terms used herein have the same meanings as those usually understood by a person of ordinary skill in the art to which the present invention belongs.

It should be noted that the terms used herein are merely used for describing specific implementations, and are not intended to limit exemplary implementations of the present invention. As used herein, the singular form is also intended to include the plural form unless the present invention clearly dictates otherwise. In addition, it should be further understood that, terms "comprise" and/or "include" used in this specification indicate that there are features, steps, operations, devices, components, and/or combinations thereof.

For convenience of description, the words "upper", "lower", "left" and "right", if exist in the present invention, only indicate upper, lower, left and right directions consistent with those of the accompanying drawings, are not intended to limit the structure, and are used only for ease of description of the present invention and brevity of description, rather than indicating or implying that the mentioned device or element needs to have a particular orientation or needs to be constructed and operated in a particular orientation. Therefore, such terms should not be construed as a limitation on the present invention.

For the part of term explanation, terms such as "mount", "connect", "connection", and "fix", if exist in the present invention, should be understood in a broad sense. For example, the connection may be a fixed connection, a detachable connection, or an integral connection, a mechanical connection, an electrical connection, a direct connection, an indirect connection by using an intermediate medium, an interior connection between two elements, or interaction between two elements. A person of ordinary skill in the art may understand specific meanings of the foregoing terms in the present invention according to a specific situation.

As described in the BACKGROUND, there are deficiencies in the prior art, and in order to solve the above technical problems, the present invention provides a three-dimensional imaging method and system for surface comprehensive geophysical prospecting, which may be applied to prospecting of karst, boulder, pile foundation, mineral exploration, etc. In this method, resistivity data of redundant two-dimensional profiles formed by a plurality of measuring lines on the site are integrated and imaged into a three-dimensional imaging system through three-dimensional coordinate transformation and Kriging interpolation, so that exploration data is presented in an intuitive and visualized manner.

Figure 1:
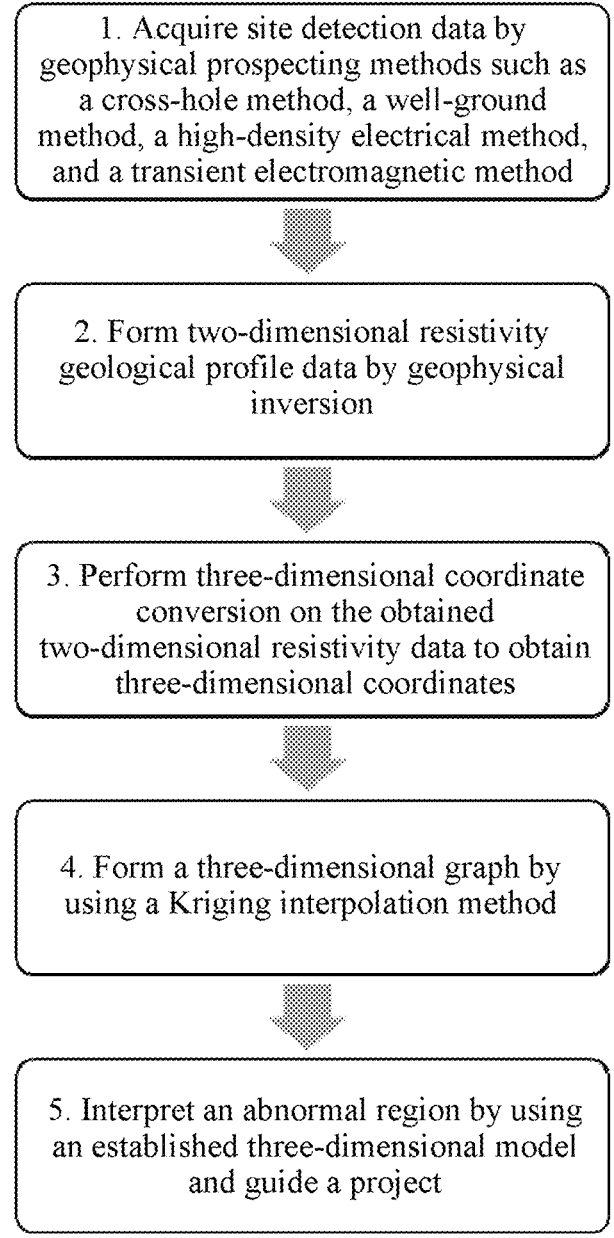
FIG. 1 is a schematic flowchart of a three-dimensional imaging method for surface detection according to an embodiment of the present invention.

In a typical implementation of the present invention, as shown in FIG. 1, a three-dimensional imaging method for surface comprehensive geophysical prospecting is provided, including:

By means of a cross-hole method, a well-ground method, a high-density electrical method, a transient electromagnetic method, or a surface comprehensive geophysical prospecting method, detection data of a plurality of two-dimensional profiles on a detection site is obtained, and data acquired on the site is used as a forward modeling basis and is interpreted by inversion to obtain a plurality of two-dimensional profile resistivity data.

After obtaining the plurality of two-dimensional profile resistivity data through detection and inversion, plane rectangular coordinates of data points of the two-dimensional profiles are converted into three-dimensional rectangular coordinates under a particular three-dimensional rectangular coordinate system through a particular algorithm, and resistivity data of the data points under the three-dimensional rectangular coordinate system is obtained. After obtaining the resistivity data under the three-dimensional coordinate system, the obtained plurality of resistivity data points are transformed into a three-dimensional model by a Kriging interpolation method.

After obtaining the three-dimensional resistivity model, an abnormal region of the three-dimensional resistivity model may be interpreted, so as to guide the site construction.

Specifically, as shown in FIG. 1, a three-dimensional imaging method flow for surface detection in this embodiment includes:

1: A detection scheme and a layout scheme of measuring lines are selected according to a specific construction situation of a surface detection site. One of a cross-hole method, a well-ground method, a high-density electrical method, a transient electromagnetic method, and a surface comprehensive geophysical prospecting method may be used to perform surface detection. After detection, resistivity detection data of a plurality of two-dimensional profiles of the surface detection site may be obtained.

If the cross-hole method is used, transmitting holes and receiving holes are distributed in parallel at a certain cross-hole interval, and the depths of the transmitting holes and the receiving holes are both greater than a detection target depth. A certain number of transmitting electrodes are arranged in the transmitting holes, and a certain number of receiving electrodes are arranged in the receiving holes. Detection data is obtained by energizing the transmitting electrodes and receiving electricity by the receiving electrodes.

If the well-ground method is used, transmitting electrodes are located in transmitting holes, receiving electrodes are located on the surface, and detection data is obtained by energizing the transmitting electrodes and receiving electricity by the receiving electrodes.

If the high-density electrical method is used, all electrodes need to be arranged on various measuring points of an observation profile, and then data can be rapidly acquired and automatically acquired by using a programmable electrode conversion device and a microcomputer engineering electrical measuring instrument.

If the transient electromagnetic method is used, it is necessary to send a pulsed primary electromagnetic field to the underground by using an ungrounded return line or grounding electrode, and use a coil or grounding electrode to observe space and time distributions of a secondary electromagnetic field generated by an underground eddy current induced by the pulsed electromagnetic field.

If the surface comprehensive geophysical prospecting method is used, it is necessary to combine the above various layout schemes of measuring lines and detection modes.

2: Geophysical inversion is performed on the acquired detection data of the two-dimensional profiles. By taking the data acquired on the site in step 1 as a forward modeling basis, model parameters are continuously adjusted, so that a model response thereof is changed into an observation data response, i.e. the data is interpreted through inversion, thereby obtaining resistivity data of two-dimensional profiles of a detection plane.

3: Three-dimensional coordinate conversion is performed on the obtained resistivity data point coordinates of the two-dimensional profiles through a particular formula to obtain three-dimensional rectangular coordinates of each data point under a three-dimensional space rectangular coordinate system, i.e. resistivity data under the three-dimensional coordinate system is obtained.

4: The obtained resistivity data points of the plurality of profiles under the three-dimensional rectangular coordinate system are modeled by a Kriging interpolation method. The interpolation method considers a variation distribution of space attributes at space positions, determines a distance range that affects a value of a point to be interpolated, and then estimates an attribute value of the point to be interpolated by using sampling points within the range. According to different space positions of samples and different correlation degrees between the samples, different weights are assigned to each sample grade, and sliding weighted average is performed to estimate an average grade of central blocks. Finally, all the data points under the three-dimensional coordinate system are grouped and imaged into a three-dimensional model.

5: An abnormal region is interpreted by analyzing the established three-dimensional model, so as to guide a project.

Figure 2A:
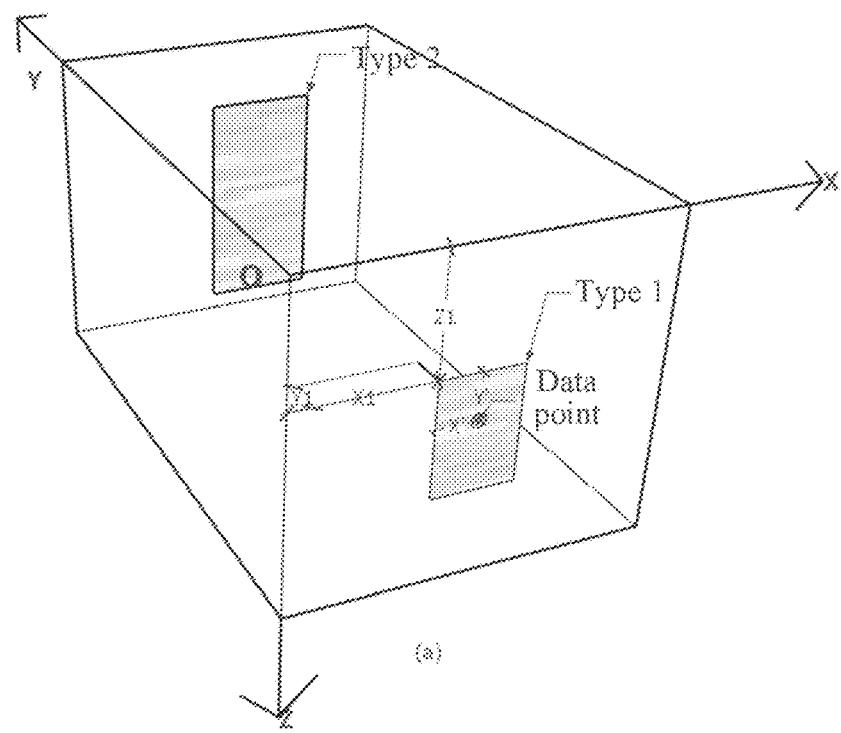
FIG. 2(a) is a schematic diagram of a measuring line plane being parallel to an XOZ plane in a three-dimensional coordinate conversion method according to an embodiment of the present invention.
Figure 2B:
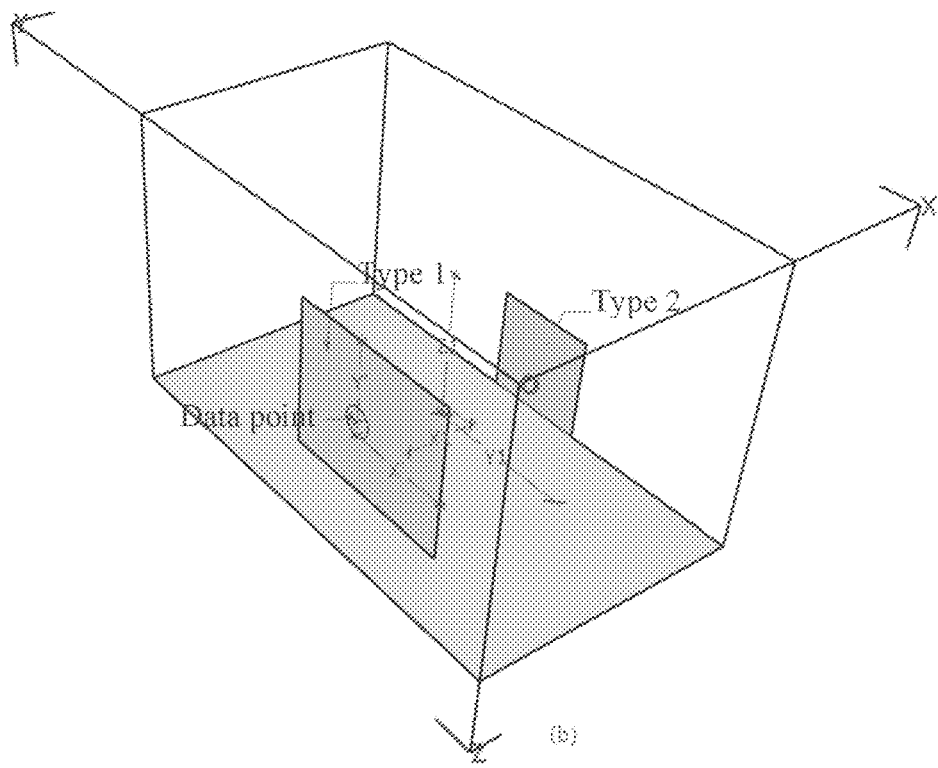
FIG. 2(b) is a schematic diagram of a measuring line plane being parallel to a YOZ plane in a three-dimensional coordinate conversion method according to an embodiment of the present invention.
Figure 2C:
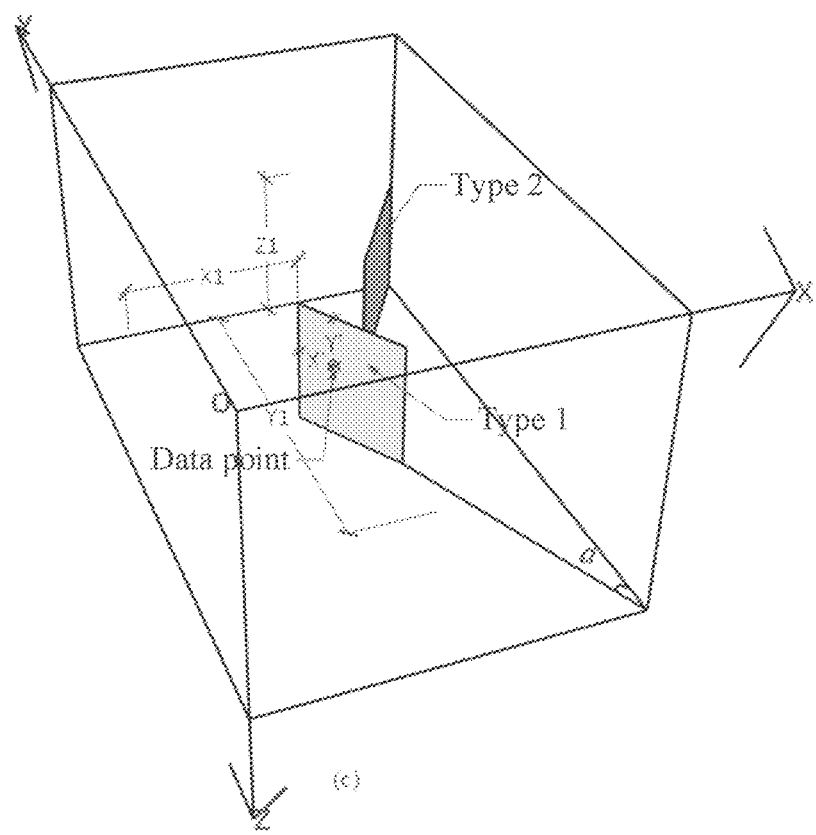
FIG. 2(c) is a schematic diagram of a measuring line plane being inclined in a three-dimensional coordinate conversion method according to an embodiment of the present invention.

The process of three-dimensional coordinate conversion in the above steps, as shown in FIGS. 2(a)-2(c), includes:

Coordinate conversion modes under three conventional measuring line modes are constructed in this embodiment. Firstly, a three-dimensional coordinate axis is established, after an origin is selected according to a specific situation of a construction site, an X direction of the three-dimensional coordinate axis is a horizontal distance direction in which a horizontal rightward direction is positive, a Y direction is a detection depth direction in which a ground parallel direction toward detection is positive, and a Z direction is a vertical distance direction in which a ground vertical downward direction is positive.

A measuring line is manually laid on the surface according to a particular direction on a detection site. Three possible manual laying directions of the measuring line are divided into three measuring line arrangement situations. The position and inclination angle of a measuring line plane in three-dimensional coordinates are the position and inclination angle of a surface measuring line.

The measuring line plane refers to a two-dimensional profile directly below the surface measuring line, and electrical signals excited by the manually laid surface measuring line may obtain resistivity data on the two-dimensional profile directly below the measuring line.

The first measuring line situation, i.e. measuring line situation (a), is a situation where the measuring line plane is parallel to an XOZ plane as shown in FIG. 2(a), and measuring line situation (a) is also divided into a situation where the measuring line plane is near an origin of coordinates and a situation where the measuring line plane is away from the origin.

The second measuring line situation, i.e. measuring line situation (b), is a situation where the measuring line plane is parallel to a YOZ plane as shown in FIG. 2(b), and measuring line situation (b) is also divided into a situation where the measuring line plane is near an origin of coordinates and a situation where the measuring line plane is away from the origin.

The third measuring line situation, i.e. measuring line situation (c), is a situation where the measuring line plane is inclined to the YOZ plane (perpendicular to an XOY plane) and an angle between the measuring line plane and the YOZ plane is α as shown in FIG. 2(c), and measuring line situation (c) is also divided into a situation where an angle between the measuring line plane and a positive direction of a Y axis is α and a situation where an angle between the measuring line plane and a negative direction of the Y axis is α.

In this embodiment, coordinate conversion modes under three conventional measuring line modes are constructed. After obtaining position coordinates of measuring lines arranged and positions of data points on a measuring line plane, three-dimensional coordinates of any point in a measured region may be obtained through mathematical formula calculation, which lays the method foundation for the later three-dimensional mapping, makes the detection results of practical engineering three-dimensional, and makes interpretation more convenient and feasible.

The three-dimensional coordinate conversion is performed by the following formula:

$$\begin{bmatrix} X \\ Y \\ Z \end{bmatrix} = R_1 \begin{bmatrix} X_1 \\ Y_1 \\ Z_1 \end{bmatrix} + R_2 \begin{bmatrix} X' \\ Y' \\ 0 \end{bmatrix}$$

where X, Y and Z are final three-dimensional coordinates with O as an origin, X1 is a horizontal distance from a starting point of the measuring line to the origin of coordinates, Y1 is a longitudinal buried depth from the starting point of the measuring line to the origin of coordinates, Z1 is a vertical height from the starting point of the measuring line to the origin of coordinates, X' is a horizontal length of an original data point, Y' is a detection depth of the original data point, Z' has an initial value of 0, R1 is a position matrix, and R2 is a data point matrix.

R1 is a position matrix, and $$R1 = \begin{bmatrix} 1 & 0 & 0 \\ 0 & 1 & 0 \\ 0 & 0 & 1 \end{bmatrix}.$$

R2 is a data point matrix, and R2 has different values according to different situations of the measuring line plane. R1 and R2 under different measuring line situations described previously are selected according to the following table:

If the measuring line plane is parallel to an XOZ plane of the three-dimensional coordinate system, R2 is $$\begin{bmatrix} 1 & 0 & 0 \\ 0 & 0 & 0 \\ 0 & 1 & 0 \end{bmatrix}.$$

If the measuring line plane is parallel to a YOZ plane of the three-dimensional coordinate system, R2 is $$\begin{bmatrix} 0 & 0 & 0 \\ 1 & 0 & 0 \\ 0 & 1 & 0 \end{bmatrix}.$$

If the measuring line plane is perpendicular to the XOY plane and inclined to the right and an angle between the measuring line plane and a negative direction of a Y axis of the YOZ plane is α, R2 is $$\begin{bmatrix} \cos\alpha & 0 & 0 \\ -\sin\alpha & 0 & 0 \\ 0 & 1 & 0 \end{bmatrix}.$$

If the measuring line plane is perpendicular to the XOY plane and inclined to the left and an angle between the measuring line plane and a positive direction of the Y axis of the YOZ plane is α, R2 is $$\begin{bmatrix} \cos\alpha & 0 & 0 \\ \sin\alpha & 0 & 0 \\ 0 & 1 & 0 \end{bmatrix}.$$

| Specific parameter | Measuring line position | Specific position | R1 | R2 |
|---|---|---|---|---|
| (a) Type 1 | Parallel to YOZ plane | Proximal end of origin | $\begin{bmatrix} 1 & 0 & 0 \\ 0 & 1 & 0 \\ 0 & 0 & 1 \end{bmatrix}$ | $\begin{bmatrix} 0 & 0 & 0 \\ 1 & 0 & 0 \\ 0 & 1 & 0 \end{bmatrix}$ |
| (a) Type 2 | | Distal end of origin | | $\begin{bmatrix} 0 & 0 & 0 \\ 1 & 0 & 0 \\ 0 & 1 & 0 \end{bmatrix}$ |
| (b) Type 1 | Parallel to XOZ plane | Proximal end of origin | | $\begin{bmatrix} 1 & 0 & 0 \\ 0 & 0 & 0 \\ 0 & 1 & 0 \end{bmatrix}$ |
| (b) Type 2 | | Distal end of origin | | $\begin{bmatrix} 1 & 0 & 0 \\ 0 & 0 & 0 \\ 0 & 1 & 0 \end{bmatrix}$ |
| (c) Type 1 | Inclined to plane | Inclined to the right | | $\begin{bmatrix} \cos\alpha & 0 & 0 \\ -\sin\alpha & 0 & 0 \\ 0 & 1 & 0 \end{bmatrix}$ |

-continued

| Specific parameter | Measuring line position | Specific position | R1 | R2 |
|---|---|---|---|---|
| (c) Type 2 | | Inclined to the left | | $\begin{bmatrix} \cos\alpha & 0 & 0 \\ \sin\alpha & 0 & 0 \\ 0 & 1 & 0 \end{bmatrix}$ |

Note:
α is an angle between an inclined plane and a YOZ plane

The above descriptions are merely preferred embodiments of the present invention and are not intended to limit the present invention. A person skilled in the art may make various alterations and variations to the present invention. Any modification, equivalent replacement, or improvement made within the spirit and principle of the present invention shall fall within the protection scope of the present invention.

What is claimed is:

1. A three-dimensional imaging method for surface comprehensive geophysical prospecting, comprising:
    acquiring detection data of a plurality of two-dimensional profiles of a surface detection site;
    forming two-dimensional profile resistivity data by geophysical inversion of the detection data;
    performing three-dimensional coordinate conversion on the two-dimensional profile resistivity data to obtain resistivity data of a three-dimensional coordinate system; and
    converting the resistivity data of the three-dimensional coordinate system into a three-dimensional model by using a Kriging interpolation method;
    wherein, a process of converting the resistivity data of the three-dimensional coordinate system into the three-dimensional model, comprises:
    determining an origin and establishing a three-dimensional coordinate axis;
    obtaining position coordinates of a measuring line and a position of a two-dimensional profile resistivity data point on a measuring line plane; and
    obtaining three-dimensional coordinates of the two-dimensional profile resistivity data point by a three-dimensional coordinate conversion formula; wherein, the three-dimensional coordinate conversion formula is:

$$\begin{bmatrix} X \\ Y \\ Z \end{bmatrix} = R_1 \begin{bmatrix} X_1 \\ Y_1 \\ Z_1 \end{bmatrix} + R_2 \begin{bmatrix} X' \\ Y' \\ 0 \end{bmatrix},$$

wherein X, Y and Z are final three-dimensional coordinates with O as an origin, $X_1$ is a horizontal distance from a starting point of the measuring line to the origin of coordinates, $Y_1$ is a longitudinal buried depth from the starting point of the measuring line to the origin of coordinates, $Z_1$ is a vertical height from the starting point of the measuring line to the origin of coordinates, $X'$ is a horizontal length of an original data point, $Y'$ is a detection depth of the original data point, $Z'$ has an initial value of 0, $R_1$ is a position matrix, and $R_2$ is a data point matrix.

2. The three-dimensional imaging method for surface comprehensive geophysical prospecting according to claim 1, wherein one of a cross-hole method, a well-ground method, a high-density electrical method, a transient electromagnetic method, and a surface comprehensive geophysical prospecting method is used to perform surface detection when acquiring the detection data of the two-dimensional profiles.

3. The three-dimensional imaging method for surface comprehensive geophysical prospecting according to claim 1, wherein an X direction of the three-dimensional coordinate axis is a horizontal distance direction in which a horizontal rightward direction is positive, a Y direction is a detection depth direction in which a ground parallel direction toward detection is positive, and a Z direction is a vertical distance direction in which a ground vertical downward direction is positive.

4. The three-dimensional imaging method for surface comprehensive geophysical prospecting according to claim 1, wherein $R_1$ is $$\begin{bmatrix} 1 & 0 & 0 \\ 0 & 1 & 0 \\ 0 & 0 & 1 \end{bmatrix}.$$

5. The three-dimensional imaging method for surface comprehensive geophysical prospecting according to claim 1, wherein if the measuring line plane is parallel to an XOZ plane of the three-dimensional coordinate system, $R_2$ is $$\begin{bmatrix} 1 & 0 & 0 \\ 0 & 0 & 0 \\ 0 & 1 & 0 \end{bmatrix}.$$

6. The three-dimensional imaging method for surface comprehensive geophysical prospecting according to claim 1, wherein if the measuring line plane is parallel to a YOZ plane of the three-dimensional coordinate system, $R_2$ is $$\begin{bmatrix} 0 & 0 & 0 \\ 1 & 0 & 0 \\ 0 & 1 & 0 \end{bmatrix}.$$

7. The three-dimensional imaging method for surface comprehensive geophysical prospecting according to claim 1, wherein if the measuring line plane is perpendicular to the XOZ plane and an angle between the measuring line plane and a positive direction of a Y axis of the YOZ plane is α, $R_2$ is $$\begin{bmatrix} \cos\alpha & 0 & 0 \\ \sin\alpha & 0 & 0 \\ 0 & 1 & 0 \end{bmatrix},$$

and if the measuring line plane is perpendicular to the XOY plane and an angle between the measuring line plane and a negative direction of the Y axis of the YOZ plane is α, $R_2$ is $$\begin{bmatrix} \cos\alpha & 0 & 0 \\ -\sin\alpha & 0 & 0 \\ 0 & 1 & 0 \end{bmatrix}.$$

* * * * *